US008194194B2

(12) United States Patent
Kishi

(10) Patent No.: US 8,194,194 B2
(45) Date of Patent: Jun. 5, 2012

(54) DISPLAY SYSTEM

(75) Inventor: Nobuya Kishi, Yamato-Koriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 993 days.

(21) Appl. No.: 12/173,911

(22) Filed: Jul. 16, 2008

(65) Prior Publication Data

US 2009/0033605 A1 Feb. 5, 2009

(30) Foreign Application Priority Data

Jul. 31, 2007 (JP) ................................ 2007-199835

(51) Int. Cl.
*H04N 5/64* (2006.01)

(52) U.S. Cl. ......... 348/836; 348/787; 348/789; 348/794

(58) Field of Classification Search ........................ None
See application file for complete search history.

(56) References Cited

U.S. PATENT DOCUMENTS

| | | | | |
|---|---|---|---|---|
| 2002/0008692 | A1* | 1/2002 | Omura et al. | 345/173 |
| 2003/0222034 | A1* | 12/2003 | Champion et al. | 211/26 |
| 2007/0195210 | A1* | 8/2007 | Rudzki | 348/838 |

FOREIGN PATENT DOCUMENTS

| | | | |
|---|---|---|---|
| JP | 02-011381 | | 1/1990 |
| JP | 03-201499 | | 9/1991 |
| JP | 04-276696 | | 10/1992 |
| JP | 05-044857 | | 6/1993 |
| JP | 2000-252939 | * | 9/2000 |
| JP | 2003-347774 | | 12/2003 |
| JP | 2004-104367 | | 4/2004 |

* cited by examiner

*Primary Examiner* — Joseph Ustaris
*Assistant Examiner* — Frederick Bailey
(74) *Attorney, Agent, or Firm* — Renner, Otto, Boisselle & Sklar, LLP

(57) ABSTRACT

In a displays system provided with a large-sized display apparatus and a pedestal for supporting the display apparatus, a space of the pedestal is effectively used while preventing a fall of the pedestal effectively. The display system has a display apparatus and a pedestal for supporting the display apparatus. Further, a plurality of electronic equipment (such as scanner apparatus, a printer, not-shown control apparatus) are disposed so as to be drawable frontward with respect to the pedestal. In addition, the display system includes a restriction mechanism for restricting, when at least one of the electronic equipment is drawn out frontward, so that at least one of other electronic equipment can not be drawn out frontward.

7 Claims, 14 Drawing Sheets

DISPLAY SYSTEM

This Non-provisional application claims priority under 35 U.S.C. §119(a) on Patent Application No. 2007-199835 filed in JAPAN on Jul. 31, 2007, the entire contents of which are hereby incorporated herein by reference.

FIELD OF THE INVENTION

The present invention relates to a display system, more specifically, to a display system provided with a large-sized display apparatus and a scanner apparatus disposed therebelow.

BACKGROUND OF THE INVENTION

A display system is proposed, that information can be written on a large-sized display apparatus in a free format using input means such as a touch pen and all of the written information is converted into electronic information, so that the document management, distribution of the electronic information, and processing of the electronic information, can be easily performed. Such a display system is applied, for example, to an electronic conference system, and used to display materials on the display apparatus and to convert conference contents written on the display apparatus into electronic information.

In such a display system including a large-sized display apparatus, since the size of the system as a whole is increased, the compact structure has been required so that the installation space is effectively used. In this case, it is also required to consider the operability so that the convenience for users is not degraded. Further, since such a system including a display apparatus is disposed on a movable pedestal (stand) etc., provided with casters, it is necessary to maintain the stability of the system so as not to cause an accident such as a fall.

Concerning a technique of the space-saving and improvement of the stability in the above display apparatus, for example, Japanese Laid-Open Patent Publication No. 2004-104367 discloses a mounting base and a display apparatus aiming to make it possible to prevent a fall and to pass through a bottle neck such as an opening of a door easily. The mounting base described in the Japanese Laid-Open Patent Publication No. 2004-104367 is formed with a support portion which has legs protruding to a plurality of directions in the lower part of a main body shaped like a nearly rectangular parallelepiped, in which a right front leg protrudes to a right front of the main body, a left front leg protrudes to a left front of the main body, a right rear leg protrudes to a right rear of the main body, and a left rear leg protrudes to a left rear of the main body, respectively, and the support portion in a front face side of the main body and the front face of the main body have a nearly same shape when viewed from the above.

When a display apparatus supported by a movable pedestal provided with casters, as described above, is moved, there is a risk that the display apparatus falls down. In particular, in the structure that the display apparatus is supported at a high position, the center of the gravity of the display apparatus becomes higher, which causes a high risk of falling down at the time of movement. For example, when a large-sized display apparatus used for a conference etc., is applied, since the display apparatus has a larger size and is supported at a higher position, there is a much higher risk of falling down.

In the mounting base described in the Japanese Laid-Open Patent Publication No. 2004-104367, the structure that the support portion protruding to a plurality of directions is provided on the mounting base is disclosed. However, the mounting base described in the Japanese Laid-Open Patent Publication No. 2004-104367 requires a special component for preventing a fall, thus the mounting base becomes very expensive.

Further, a mounting base of a general large-sized display has a problem that there are many wasteful spaces and spaces are not used effectively.

SUMMARY OF THE INVENTION

An object of the present invention is to provide a display system provided with a large-sized display apparatus and a pedestal for supporting the display apparatus, in which it is possible to prevent a fall of the pedestal effectively and to use a space of the pedestal effectively.

An object of the present invention is to provide a display system having a display apparatus for displaying information and a pedestal for supporting the display apparatus from a lower side, in which a mounting base on which an electronic equipment is placed is provided in the pedestal and a plurality of electronic equipment are disposed below the display apparatus, wherein, when a face in which a display screen of the display apparatus is visible is defined as a front face of the display apparatus, and a near side toward the face in which the display screen is visible is defined as a front side of the display system, the plurality of electronic equipment are disposed so as to be drawable frontward from the front face of the display apparatus, and a restriction mechanism is provided for restricting, when at least one electronic equipment is drawn out frontward, so that at least one of the other electronic equipment can not be drawn out frontward.

Another object of the present invention is to provide a display system, wherein among the plurality of electronic equipment, an electronic equipment which is heavier than other electronic equipment is disposed downward from the other electronic equipment.

Another object of the present invention is to provide a display system, wherein the electronic equipment includes an image reading apparatus for reading an image from an original to generate image data, an image forming apparatus for forming the image on a recording medium in accordance with the image data, and a control apparatus for controlling a display screen of the display apparatus.

Another object of the present invention is to provide a display system, wherein the image reading apparatus and the image forming apparatus are disposed so as to be slidable respectively and individually, and are drawable frontward from a stored position in the pedestal respectively and individually.

Another object of the present invention is to provide a display system, wherein the image forming apparatus and the controlling apparatus are disposed so as to be able to slide in a body, and are drawable frontward in a body from the stored position in the pedestal.

Another object of the present invention is to provide a display system, wherein the pedestal has a falling preventive leg for preventing a fall of the display system and a foundational base for supporting the mounting base so as to be slidable, wherein the mounting base is on the falling preventive leg, and drawable by sliding frontward from the position where the falling preventive leg is stored in the foundational base, and wherein the falling preventive leg is positioned at the same position as, or at the position backward from, the front face of the display apparatus with respect to a back and forth direction of the display system when the falling preventive leg is stored in the foundational base, and protrudes frontward from the front face of the display apparatus when the falling preventive leg is drawn out forward.

Another object of the present invention is to provide a display system, wherein a fixing mechanism for fixing the foundational base and the falling preventive leg, in a state where the falling preventive leg is stored in the foundational base, or is drawn out by sliding frontward.

PREFERRED EMBODIMENTS OF THE INVENTION

Figure 1:
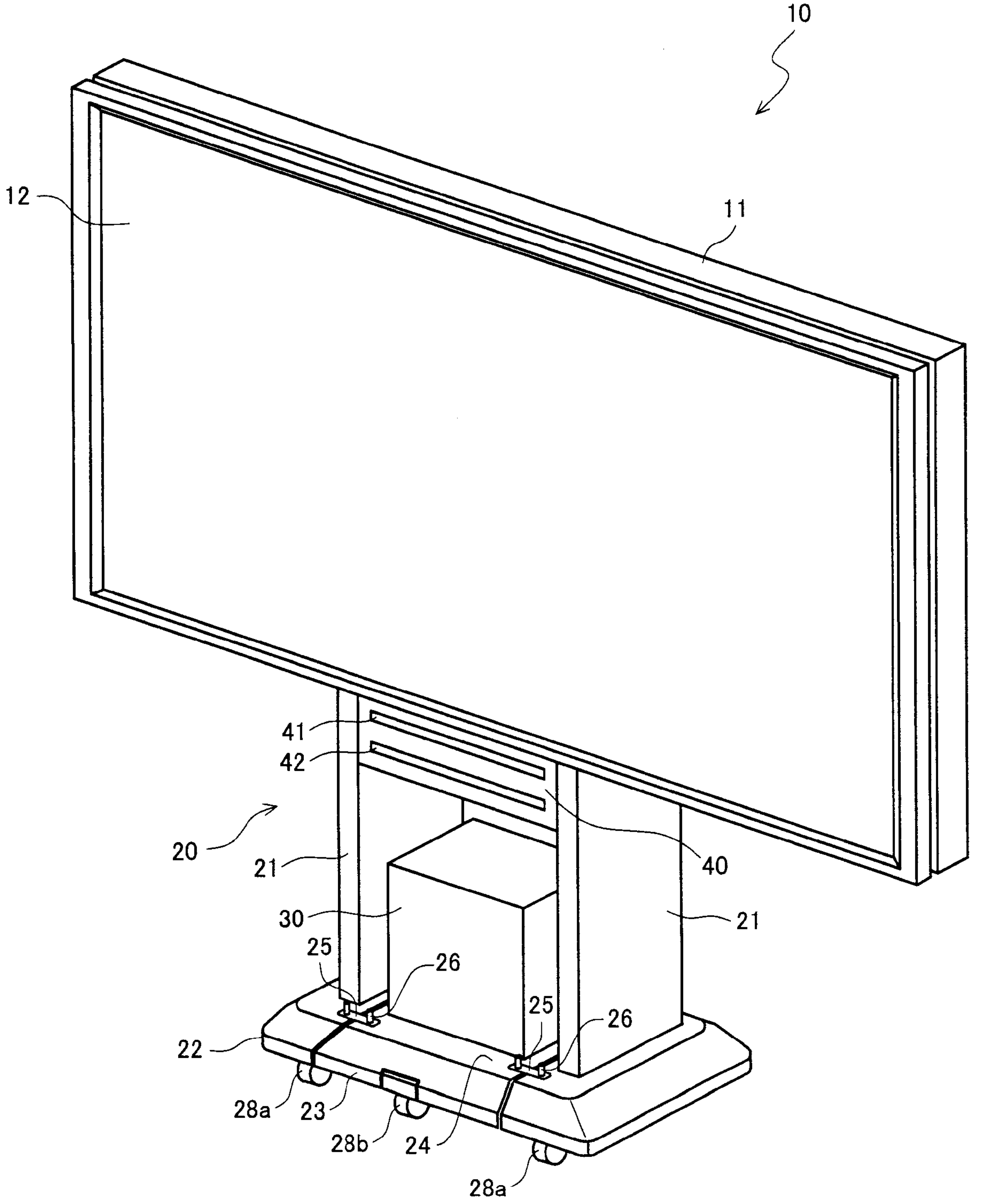
FIG. 1 is a diagram showing an embodiment of a display system according to the present invention.
Figure 2:
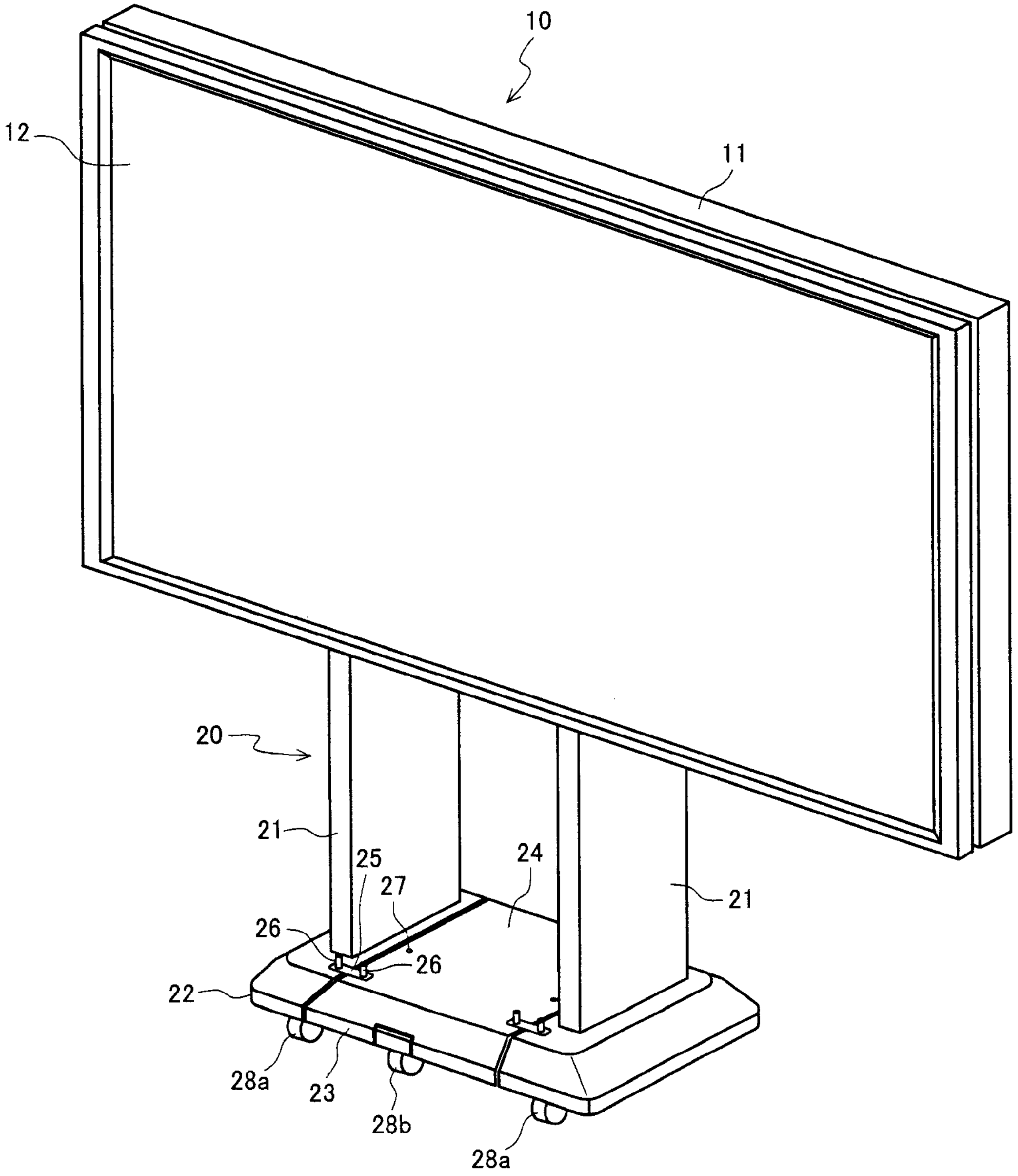
FIG. 2 is a diagram showing a state where electronic equipment such as a printer and a scanner apparatus are not incorporated in the display system shown in FIG. 1.

FIG. 1 is a diagram showing an embodiment of a display system according to the present invention, and FIG. 2 is a diagram showing a state where electronic equipment such as a printer and a scanner apparatus is not incorporated in the display system shown in FIG. 1.

The display system of the present embodiment includes a pedestal (stand) 20, a display apparatus 10 supported by the pedestal 20, and a printer 30 and a scanner apparatus 40 which are stored in the pedestal 20. Further, it is possible to put a control apparatus (controller) such as a PC (personal computer) in the rear sides of the printer and the display apparatus 10. The printer 30, the scanner apparatus 40, the controller etc. correspond to the electronic equipment of the present invention included in the display system.

The pedestal 20 which supports the display apparatus 10 includes a pair of right and left legs 21, a foundational base 22, and a falling preventive leg 23. The falling preventive leg 23 is disposed so as to be slidable back and forth with respect to the foundational base 22, and a mounting base 24 is formed on the top face of the falling preventive leg to put the electronic equipment such as the printer 30 thereon. In the present embodiment, the printer 30 is put on the mounting base 24 of the falling preventive leg 23. The controller is put in the rear side of the printer 30. Here, a face in which a display screen of the display apparatus is visible is defined as a front face side of the display apparatus 10. In addition, this side facing the display screen is defined as a front side of the present display system, and a rear face side of the display apparatus 10 is defined as a rear side of the present display system.

Casters for a foundational base (wheels for moving) 28*a* are provided on the bottom of the foundational base 22 and casters for a falling preventive leg (wheels for moving) 28*b* are provided on the bottom of the falling preventive leg 23. These casters make the whole of the display system movable.

Further, the scanner apparatus 40 is installed in the inner side space of the legs 21 above the printer 30. The scanner apparatus 40 is configured so as to be drawable by sliding frontward with a rail mechanism (not shown), etc. Further, the scanner apparatus 40 of the present embodiment includes openings 41 and 42 on the front face side thereof. The openings 41 and 42 constitute an insertion port from which a sheet-like original is inserted, and a discharge port from which an original, an image of which has been read, is discharged. By inserting a sheet-like original to the insertion port, the original is transported by a paper feed transport mechanism of the scanner apparatus 40 and conveyed to an image reading device with a CCD sensor. The original, an image of which has been read by the image reading device, is transported by a discharge roller and discharged from the discharge port.

Such a structure allows a user to feed and discharge a sheet-like original from the front face side of the scanner apparatus 40 in a state where the scanner apparatus 40 is stored between the legs 21 of the pedestal 20. In addition, when processing of reading an image of a book original or maintenance such as replacing a toner cartridge is performed, the scanner apparatus is drawn out frontward so that such processing can be performed.

As described above, the falling preventive leg 23 is attached so as to be slidable back and forth with respect to the foundational base 22. Here, a latch plate for fixing 25 is used to fix the foundational base 22 and the falling preventive leg 23 each other. Through holes through which fixing pins 26 are inserted are provided on the right and left sides of the latch plate for fixing 25. On the other hand, the falling preventive leg 23 and the foundational base 22 are provided with fixing holes 27 to which the fixing pins 26 are inserted, respectively, and the fixing pins 26 are inserted to each of the fixing holes 27 through the through holes of the latch plate for fixing 25, so that the falling preventive leg 23 and the foundational base 22 are fixed each other through the latch plate for fixing 25. The falling preventive leg 23 provides a plurality of fixing holes 27 in advance depending on the position where the falling preventive leg 23 is fixed. The latch plate for fixing 25 and the fixing pins 26 correspond to a fixing mechanism of the present invention.

The electronic equipment such as the scanner apparatus 40 and the printer 30 is stored in the above pedestal 20, and thereby the printer 30 and the scanner apparatus 40, which are not used at all times, can be stored below the display apparatus 10. Such a structure makes it possible, for example, to use the space in the pedestal 20 effectively, and allows a user who gives a presentation or proceeds with a conference in front of the display apparatus 10 to use the display system without being disturbed from such electronic equipment.

Further, the electronic equipment such as the scanner apparatus 40 and the printer 30 is stored below the display apparatus 10 in the pedestal 20 which supports the large-sized display apparatus 10, so as to be able to cause the center of the gravity of the display system to be positioned downward, thus making it possible to keep the weight balance of the display system and prevent the display system from falling down. At this time, among a plurality pieces of electronic equipment, an electronic equipment which is heavier than other electronic equipment is provided downward. Thereby, the center of the gravity of the display system can be positioned downward so as to be able to keep the weight balance of the display system and prevent the display system from falling down.

Further, at the time of drawing out the falling preventive leg 23, the electronic equipment is moved to a drawn-out direction, and therefore the weight of the electronic equipment is distributed to the drawn-out direction and the weight of the whole of the display system is equally distributed to center parts of the plurality of casters 28*a* and 28*b* included in pedestal 20, thus making it possible to improve the weight stability and to prevent a fall effectively.

Figure 3A:
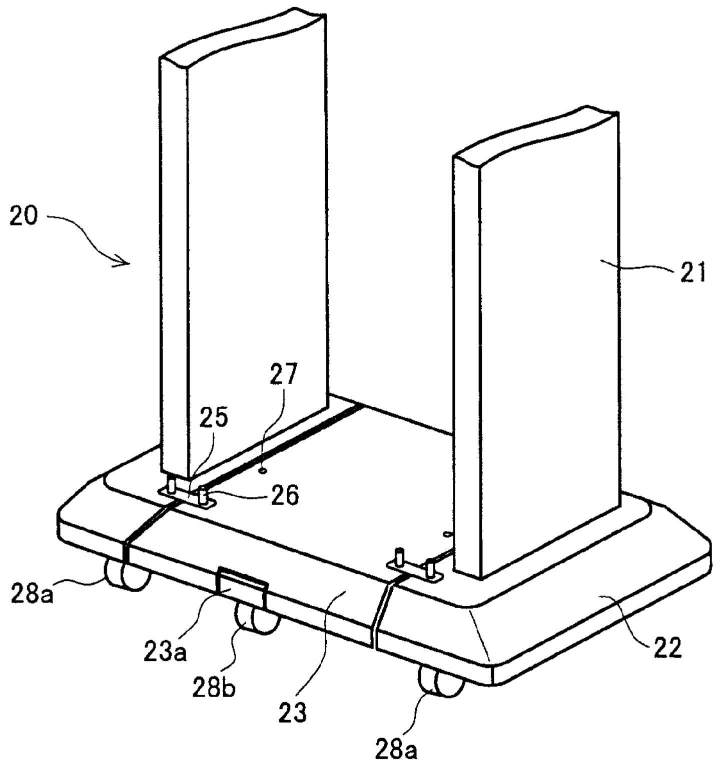
FIGS. 3A and 3B are diagrams illustrating a function of a falling preventive leg included in a pedestal.
Figure 3B:
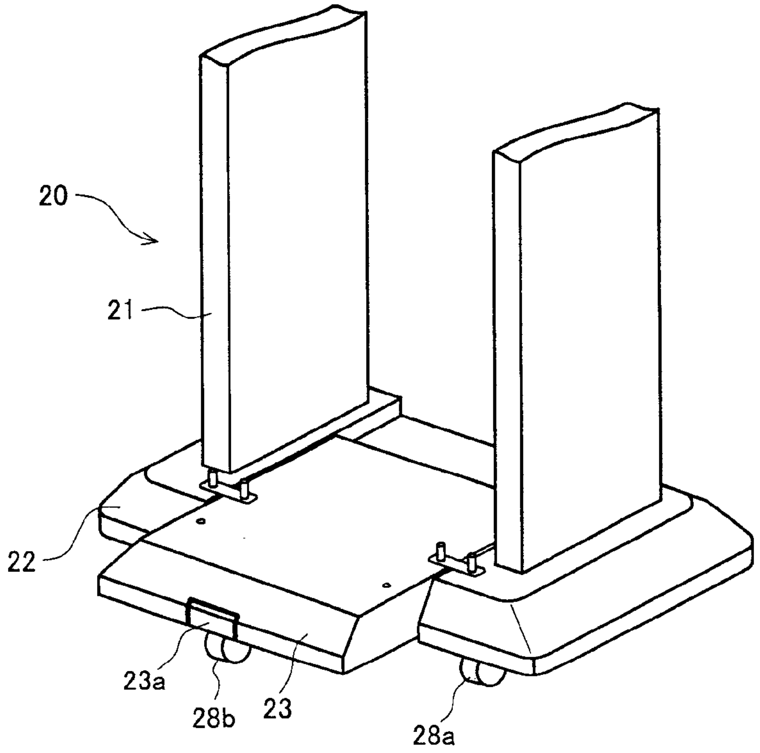

FIGS. 3A and 3B are diagrams illustrating a function of the falling preventive leg included in the pedestal. In order to fix the foundational base 22 and the falling preventive leg 23 each other as described above, the latch plate for fixing 25 and the fixing pins 26 are used. In this structure, the falling preventive leg 23 is shifted from a state of being stored between the foundational bases 22 (FIG. 3A) into a state of being drawn out frontward (FIG. 3B), and thereby it is possible to prevent the falling more effectively.

Here, the fixing pins 26 in the side of the falling preventive leg 23 are drawn out from the fixing holes 27 in the state of FIG. 3A and the falling preventive leg 23 is drawn out frontward so as to be in the state of FIG. 3B, followed by inserting the fixing pins 26 to the other fixing holes 27 on the falling preventive leg 23 at this position, thus making it possible to fix the falling preventive leg 23 and the foundational base 22 each other.

When the falling preventive leg 23 is drawn out to the front face side, a user grasps and pulls a releasing lever 23*a* provided on the falling preventive leg 23 so that the falling preventive leg 23 can be drawn out. Note that, for the structure that the falling preventive leg 23 and the foundational base 22 are fixed each other, not only the structure of using the above fixing pins 26, but any other appropriate fixing structures are employable.

Figure 4:
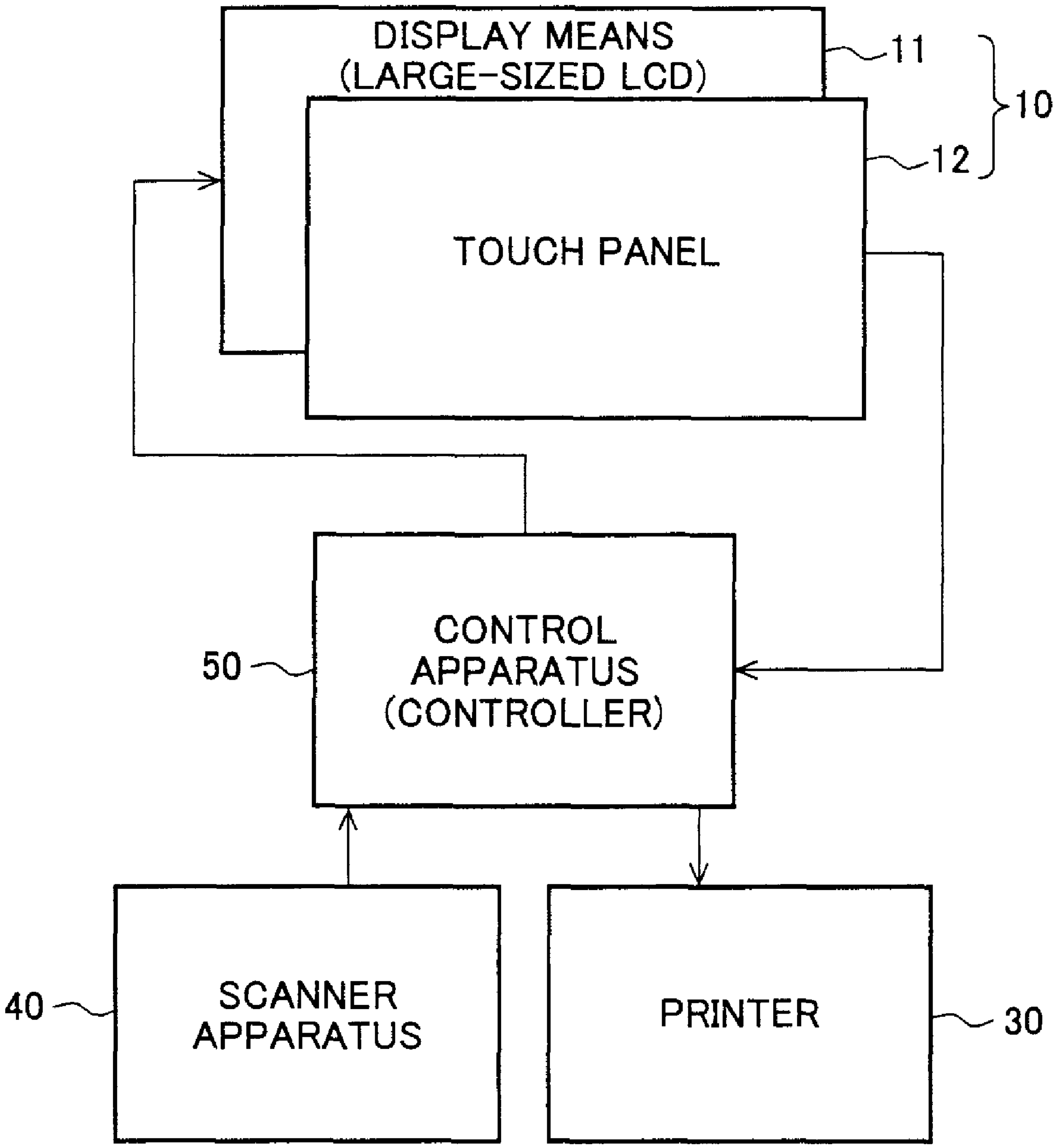
FIG. 4 is a block diagram illustrating a structural example of the display system according to the present invention.

FIG. 4 is a block diagram illustrating a structural example of the display system according to the present invention.

The display system includes the display apparatus 10, the printer 30, the scanner apparatus 40, and a control apparatus (controller) 50.

The display apparatus 10 includes display means 11 and a touch panel 12 provided on a front face side of the display means 11. As the display means 11, thin and large display apparatuses, such as a liquid crystal display, a plasma display panel, a field emission display, a surface-conduction electron-emitter display, an organic electroluminescence display, are applicable.

Further, the touch panel 12 detects a coordinate of the touched position by a user etc., to transmit to the control apparatus (controller) 50.

The control apparatus 50 controls a display screen displayed by the display means 11, and causes the display apparatus 10 to display various information in accordance with coordinate information of the touched position detected by the touch panel 12. For example, a touch pen is used to perform processing of causing the display means 11 to display information such as characters drawn on the touch panel 12. As the control apparatus 50, for example, a PC (personal computer) is used.

The printer 30 prints out the display information displayed by the display means 11. Here, the image information displayed by the display means 11 is outputted to the printer 30 with the control of the control apparatus 50, and thereby the display information on the display means 11 can be print out by the printer 30. Further, it is also possible that the printer 30 prints out image data captured by the scanner apparatus 40 which is connected to the control apparatus 50.

The scanner apparatus 40 is an apparatus for reading an image of an original to convert into electronic signal, and outputs image data obtained by reading the original image to the control apparatus 50. The image data read by the scanner apparatus 40 can be displayed by the display means 11 with the control of the control apparatus 50. In addition, as described above, it is also possible to print out from the printer 30.

The original, an image of which is read by the scanner apparatus 40, may be a sheet-shaped original or a book-shaped original (book original). In the embodiment according to the present invention, a sheet-like original can be read by feeding the original from the front face side of the scanner apparatus 40, and an image of a book original can be read by opening an upper unit of the scanner apparatus 40 in the state where the scanner apparatus 40 is drawn out frontward.

Further, in the above embodiment, although the control apparatus 50 such as a PC performs processing of displaying an image on the display means 11, or processing of outputting an image to the printer 30, the display apparatus 10 may incorporate an information processing apparatus having these functions of image processing. Further, the display apparatus 10 may include an information processing portion which performs its processing functions by distributing some of them to the control apparatus 50 such as a PC.

Figure 5A:
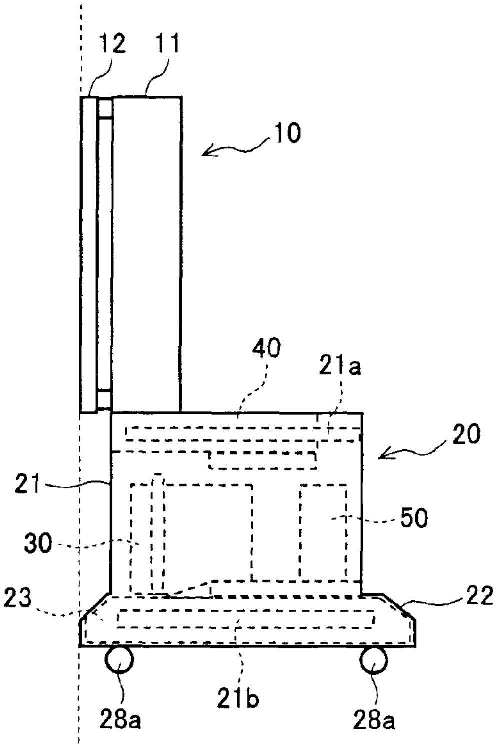
FIGS. 5A and 5B are diagrams showing a state of the display system shown in FIG. 1 when viewed from the side face.
Figure 5B:
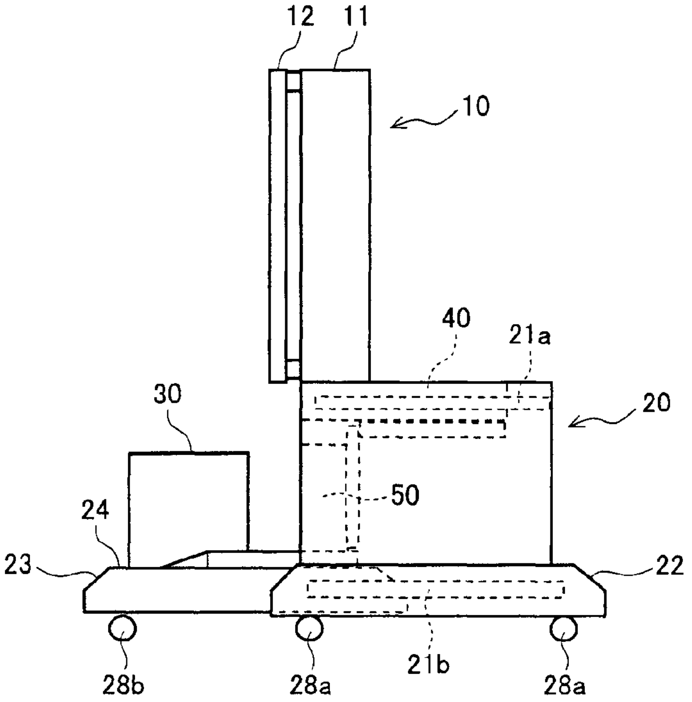

FIGS. 5A and 5B are diagrams showing a state of the display system shown in FIG. 1 when viewed from the side face, where FIG. 5A shows a state where the printer 30, the scanner apparatus 40, and the control apparatus (controller) 50 are stored between the pair of legs 21, and FIG. 5B shows a state where the printer 30 and the control apparatus 50 are drawn out frontward from the display system.

Casters for a foundational base 28*a* are attached on the bottom of the foundational base 22, which make the whole of the display system movable. Further, the printer 30 and the control apparatus 50 are placed on the mounting base 24 formed on the top face of the falling preventive leg 23. In addition, rail portions 21*a* are provided in the insides of each of the legs 21 of the pedestal 20, and a slide member attached to the scanner apparatus 40 is engaged with the rail portions 21*a*, and thereby the scanner apparatus 40 is installed so as to be drawn out freely with respect to the legs 21.

The scanner apparatus 40 which is stored between the pair of legs 21 can be drawn out frontward by a user, and thereby the user can perform operations of the scanner apparatus 40 easily. At the position where the scanner apparatus 40 is drawn out, processing of reading an image of a book original or recovery processing in the case of a jam, can be performed.

Further, by releasing the fixing by the above fixing pins 26, the falling preventive leg 23 in the lower part of the pedestal 20 can be drawn out to the front face side of the display system. The pedestal 20 is provided with rail portions 21*b* for sliding the falling preventive leg 23, and the falling preventive leg 23 can be drawn out from the pedestal 20 by a slide mechanism of the rail portions 21*b*.

The falling preventive leg 23 which is stored between the foundational bases 22 in the state of FIG. 5A is drawn out frontward (left direction of FIG. 5A) by a user so as to be in the state as shown in FIG. 5B. Accordingly, in this state, since the whole of the printer 30 is drawn out to the front face side of the legs 21, the user can easily perform an operation of taking out a sheet printed by the printer 30, an operation of jam processing when a jam occurs in the printer, or an operation of replacing a developer cartridge.

In the present embodiment, in a state where the falling preventive leg 23 is stored between the legs 21 of the pedestal 20 (FIG. 5A), the front tip part of the falling preventive leg 23 is at the same position as that of the front face of the display apparatus 10 in a back and forth direction. In addition, in the structure shown in FIGS. 5A and 5B, the front face of the display apparatus 10 corresponds to a surface of the touch panel 12.

Further, the front tip part of the falling preventive leg 23 is not restricted to be in the same position as that of the front face of the display apparatus, unless being in a position ahead of the front face of the display apparatus 10. Thereby, in a state where the falling preventive leg 23 is not drawn out, the space in front of the display system does not obstruct a user's operation of the display system.

Further, in a state where the falling preventive leg 23 is drawn out frontward as shown in FIG. 5B, the falling preventive leg 23 protrudes frontward from the front face of the display apparatus 10, and thereby it is possible to further improve the falling preventive function. At this position, as described above, an operation of taking out a paper printed by the printer 30, an operation of jam processing when a jam occurs in the printer, or an operation of replacing a developer cartridge, can be performed easily.

Figure 6:
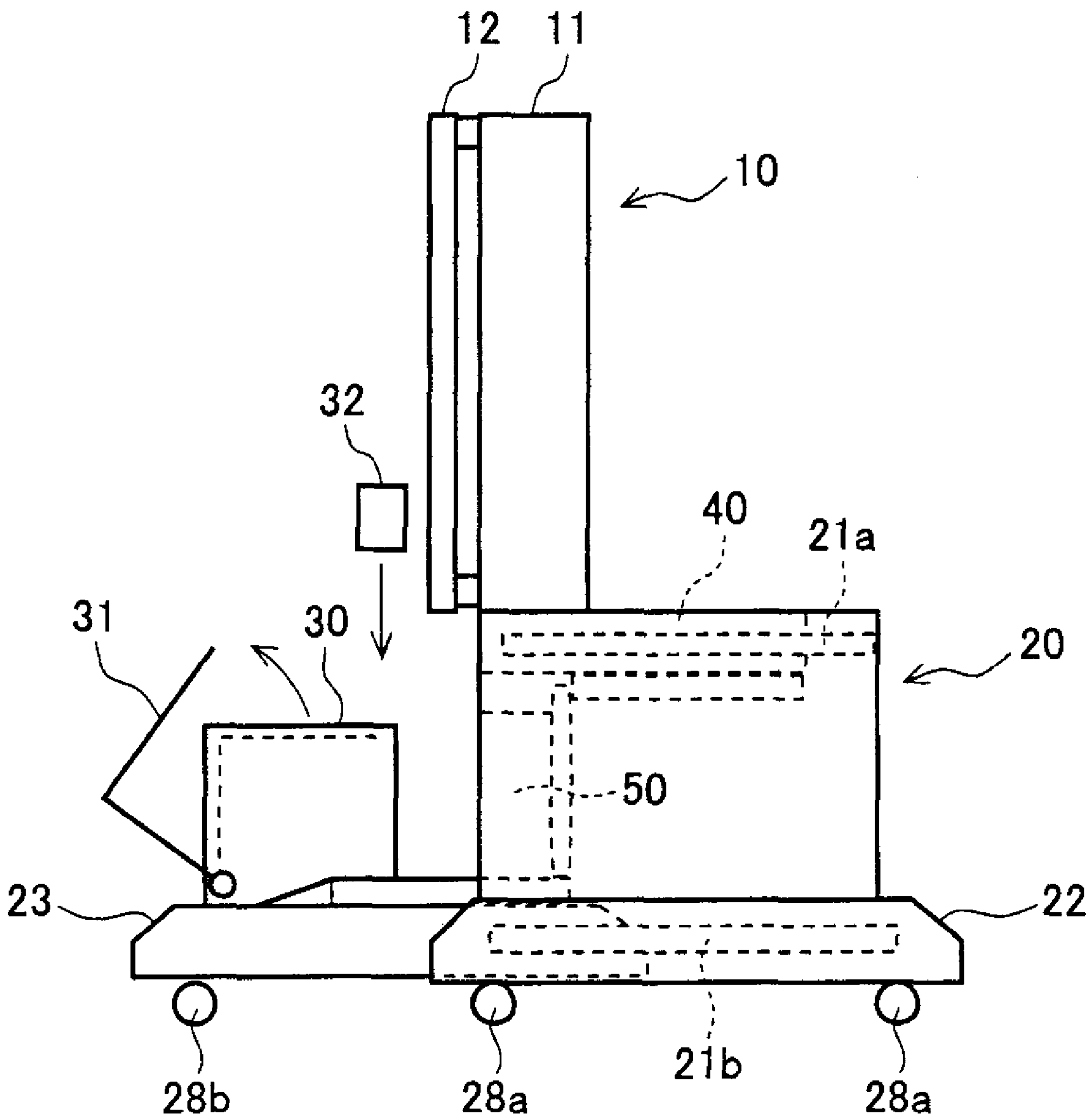
FIG. 6 is a diagram illustrating a state where maintenance of a printer is performed.

FIG. 6 is a diagram illustrating a state where maintenance of a printer is performed. As described above, the falling preventive leg 23 stored in the foundational base 22 is drawn out to the front face side so that the printer 30 which is put on the mounting base 24 of the falling preventive leg 23 can be drawn out frontward from the front face of the display apparatus 10. At this position, as shown in FIG. 6, a cover 31 of the printer 30 can be opened. Thereby, paper jam processing or replacing of a developer cartridge 32 can be performed. Here, as shown in FIG. 6, the cover 31 is provided so as to be opened to the front face side, and thereby a user can perform the above mentioned operations easily without disturbing a user of the display system.

Figure 7A:
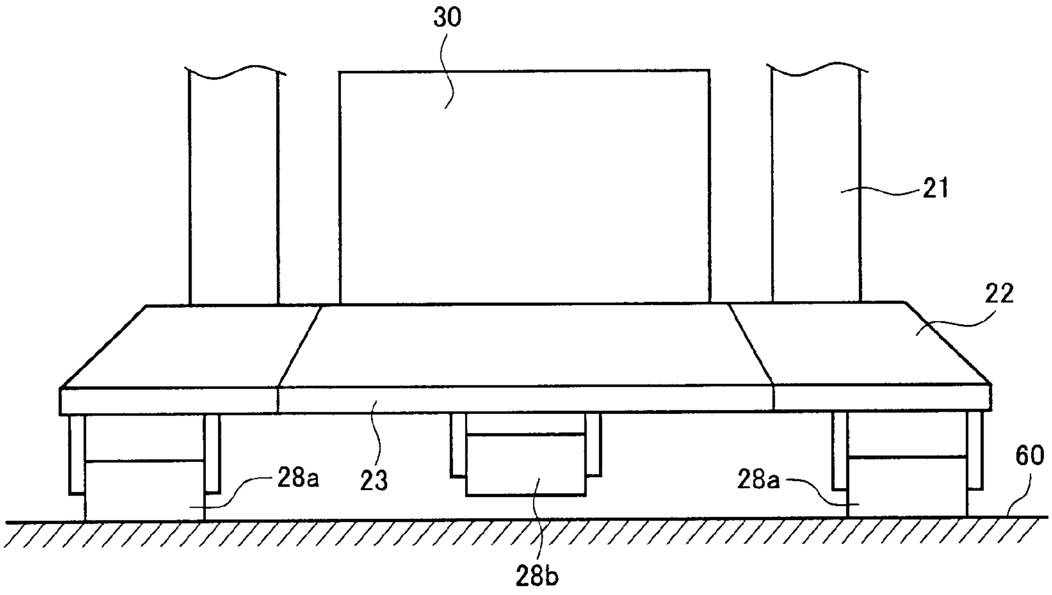
FIGS. 7A and 7B are diagrams illustrating a structural example of casters provided on the bottoms of the falling preventive leg and the foundational base.
Figure 7B:
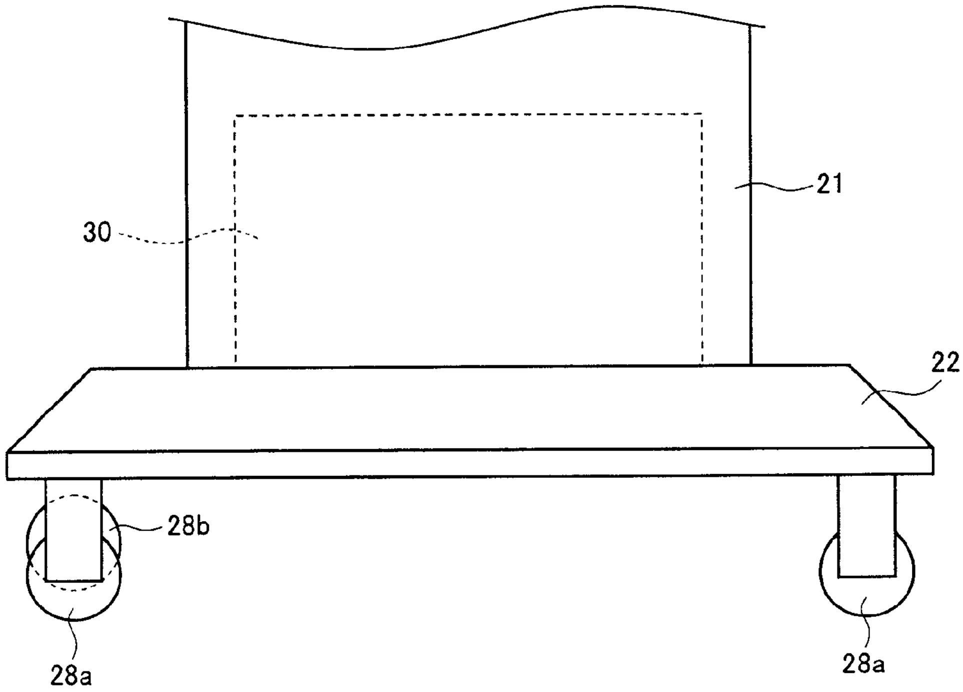

FIGS. 7A and 7B are diagrams illustrating a structural example of casters provided on the bottom of the falling preventive leg and the foundational base, where FIG. 7A shows a schematic view when the falling preventive leg 23 in a state of being stored in the foundational base 22 is viewed from the front face, and FIG. 7B shows a schematic view when the storage state shown in FIG. 7A is viewed from the side face.

As described above, the casters for a foundational base 28*a* are provided on the bottom of the foundational base 22 to make the display system movable. In addition, the casters for a falling preventive leg 28*b* are also provided on the bottom of the falling preventive leg 23.

Here, as shown in FIGS. 7A and 7B, in a state where the falling preventive leg 23 is stored in the foundational base 22, only the casters for a foundational base 28*a* provided in the foundational base 22 are in contact with a floor face 60. Further, in this state, the casters for a falling preventive leg 28*b* are positioned slightly upper than the casters for a foundational base 28*a* and not in contact with the floor face 60. That is, in this state, the display system is supported by the casters for a foundational base 28*a*.

Figure 8:
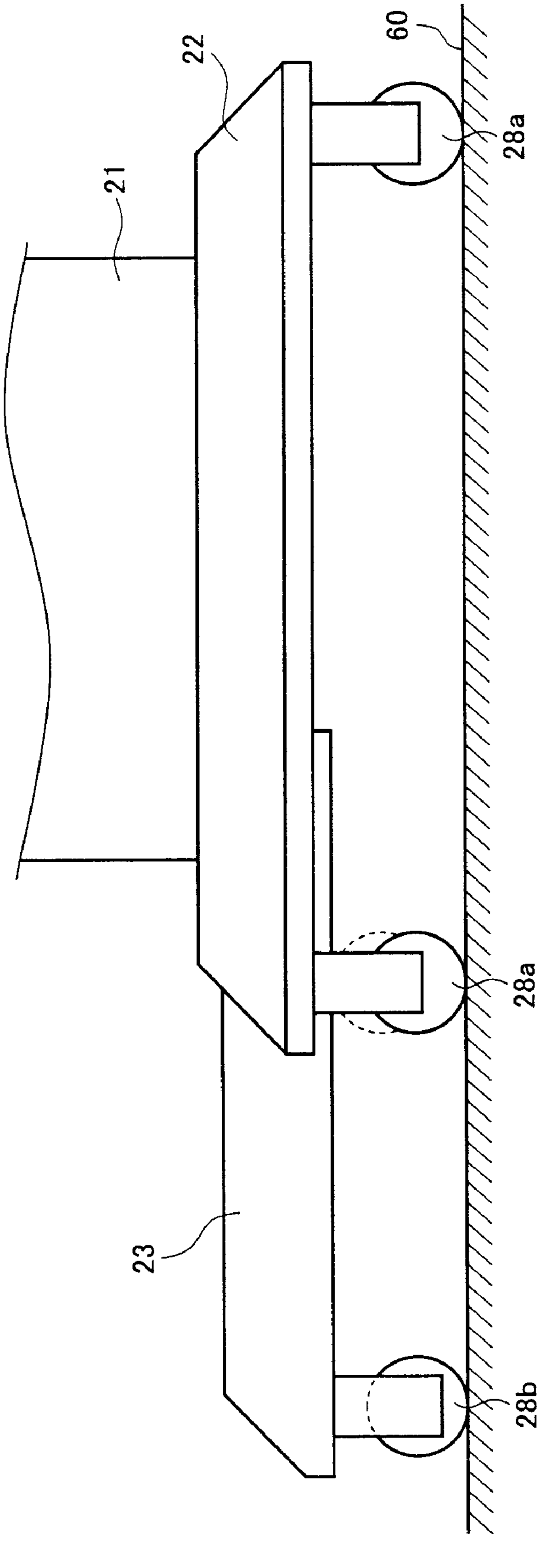
FIG. 8 is a diagram illustrating a state of the casters when the falling preventive leg is drawn out from the foundational base.

FIG. 8 is a diagram illustrating a state of the casters when the falling preventive leg is drawn out from the foundational base. In the state of FIG. 7B, when the falling preventive leg 23 is drawn out from the foundational base 22, the state of which becomes the state shown in FIG. 8. In this state, the casters for a falling preventive leg 28*b* provided on the bottom of the falling preventive leg 23 are at the same position as that of the casters for a foundational base 28*a*, and are in contact with the floor face 60. Thereby, the display system is not more likely to fall down.

When the casters for a falling preventive leg 28*b* are in contact with the floor face at all times, the weight of the display system is applied also to the casters for a falling preventive leg 28*b*, and the weight increases when a user draws out the falling preventive leg 23 frontward. On the other hand, in the present embodiment, the casters for a falling preventive leg 28*b* are not in contact with the floor face 60 in a state where the falling preventive leg 23 is stored in the foundational base 22, thus making it possible to draw out the falling preventive leg 23 easily with smaller force.

Figure 9A:
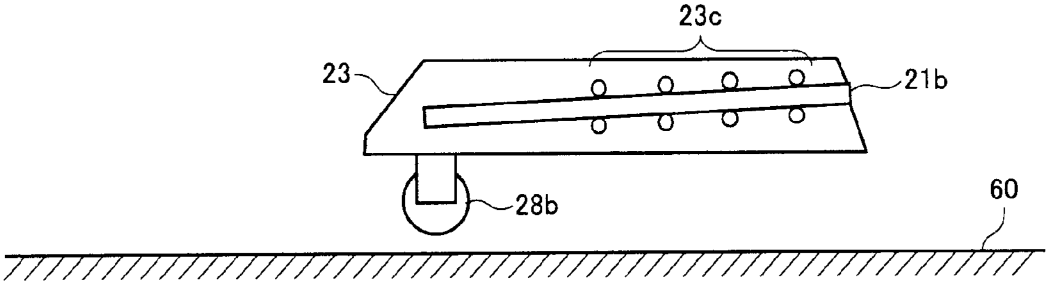
FIGS. 9A through 9C are schematic views illustrating a structural example of a rail portion for supporting the falling preventive leg slidably.
Figure 9B:
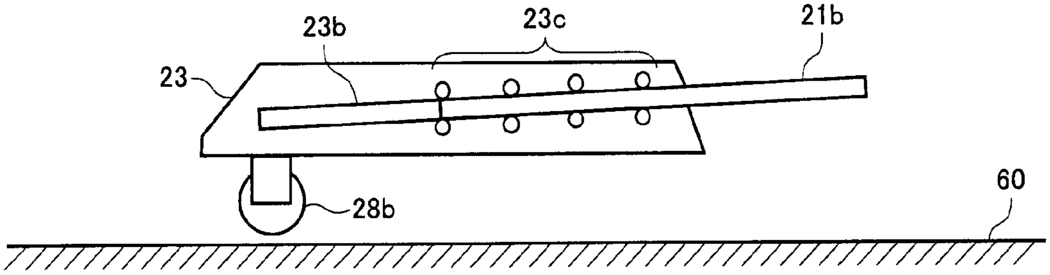
Figure 9C:
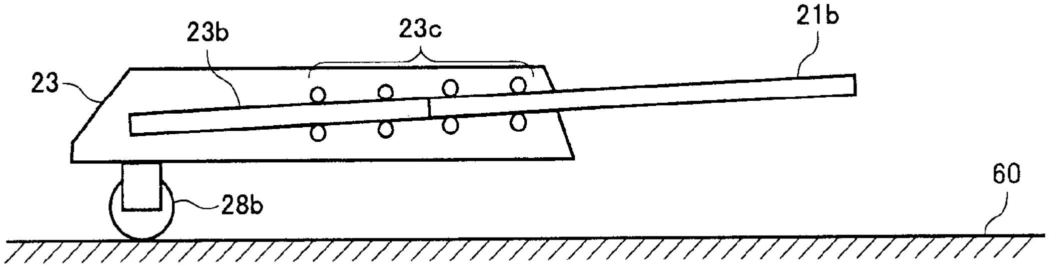

FIGS. 9A through 9C are schematic views illustrating a structural example of a rail portion for supporting the falling preventive leg slidably, where FIG. 9A shows a state where the falling preventive leg 23 is stored in the foundational base 22, FIG. 9B shows a state where the falling preventive leg 23 is being drawn out frontward, and FIG. 9C shows a state where the falling preventive leg 23 has been completely drawn out.

As described above, in a state where the falling preventive leg 23 is stored in the foundational base 22, the casters for a falling preventive leg 28*b* are provided so as to be higher than the floor face 60 and are not in contact with the floor face 60. In addition, when the falling preventive leg 23 is drawn out to the front of the display system (left direction of FIGS. 9A through 9C) so as to be in the state shown in FIG. 9C, the casters for a falling preventive leg 28*b* are in contact with the floor face 60.

To realize the structure as described above, in the present embodiment, the rail portion 21*a* for guiding the falling preventive leg 23 is provided in the foundational base 22 which stores the falling preventive leg 23. The rail portion 21*a* is attached with the slope which is higher at the rear side in the back and forth direction of the display system and becomes lower toward the front side. Further, a rail portion 23*b* is also provided in the side of the falling preventive leg, and the rail portion 23*b* is stored in the inner part of the rail portion 21*b* in the side of the foundational base 22. In addition, a rail mechanism composed of these rail portions 21*b* and 23*b* is provided so as to be expanded and contracted depending on the drawing out/storing operation of the falling preventive leg 23. Here, it may be configured so that the rail portion 21 in the side of the foundational base 22 is stored in the inner part of the rail portion 23*b* in the side of the falling preventive leg 23.

Further, the falling preventive leg 23 is provided with a roller 23*c* for facilitating the slide movement. Thereby, the falling preventive leg 23 can slide smoothly against the foundational base 22.

Figure 10A:
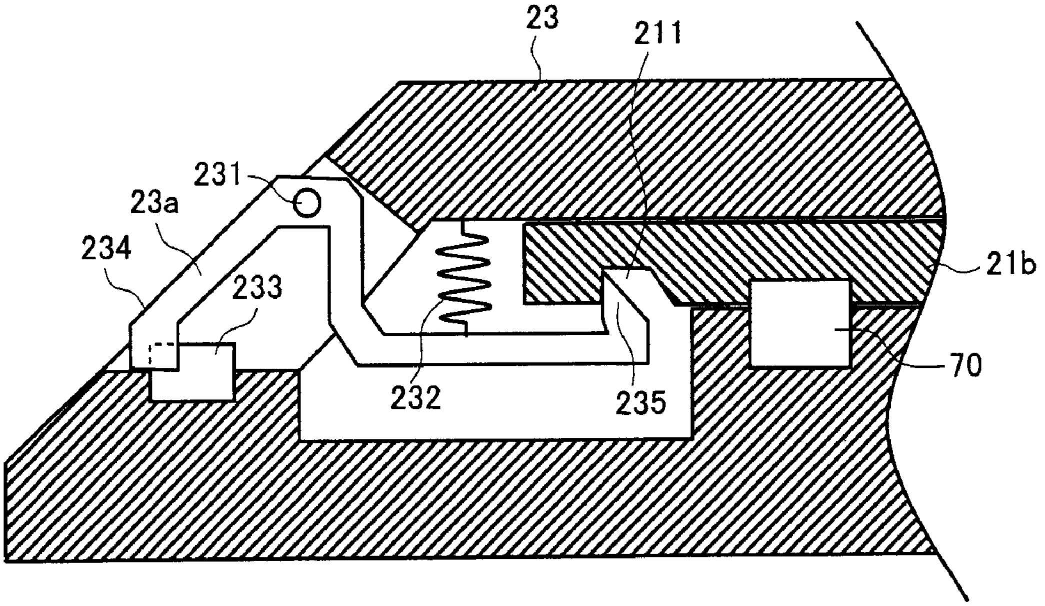
FIGS. 10A and 10B are diagrams illustrating an example of an internal structure of a front tip part of the falling preventive leg.
Figure 10B:
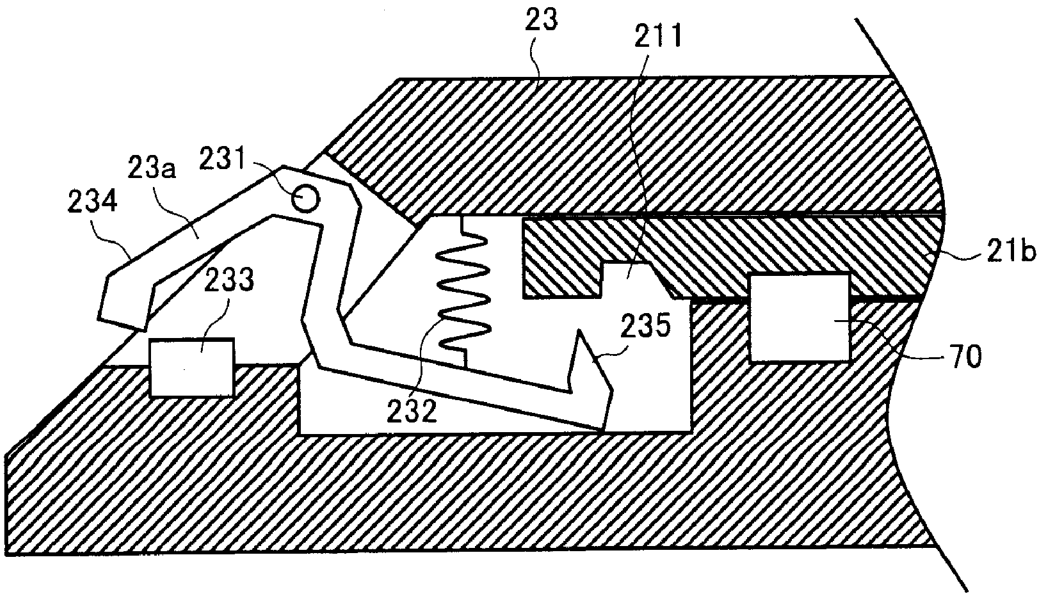

FIGS. 10A and 10B are diagrams illustrating an example of an internal structure of the front tip part of the falling preventive leg, where FIG. 10A is a schematic view showing a state where the falling preventive leg 23 is stored in the foundational base 22, and FIG. 10B is a schematic view showing a state where the falling preventive leg is being drawn out from the foundational base 22.

The falling preventive leg 23 is provided with a releasing lever 23*a*, and a user grasps and pulls the releasing lever 23*a* so that the falling preventive leg 24 can be drawn out frontward.

As shown in FIGS. 10A and 10B, the releasing lever 23*a* is attached to the falling preventive leg 23 by a support shaft 231 and is rotatable on the support shaft 231 as the rotary shaft. Further, in the near side of the releasing lever 23*a* which is supported by the support shaft 231, a handle portion 234 serving as a part grasped by the user is provided. Further, in the front tip part on the opposite side of the releasing lever 23*a*, an engaging portion 235 for engaging with the rail portion 21*b* is provided. In addition, a spring 232 is attached to a part between the engaging portion 235 and the support shaft 231, which connects an upper wall of the falling preventive leg 23 and the releasing lever 23*a*. By the spring 232, the engaging portion 235 is energized upward.

On the other hand, a notch 211 is provided on the edge in the front side of the rail portion 21*b* which is attached to the foundational base 22. Further, in the storage state of the falling preventive leg 23 as shown in FIG. 10A, the engaging portion 235 of the releasing lever 23*a* is engaged with the notch 211 of the rail portion 21*b*. At this time, by the spring 232, energization force is applied to a direction that the engaging of the engaging portion 235 and the notch 211 is maintained.

When a user draws out the falling preventive leg 23 frontward, the user grasps and pulls up the handle portion 234 of the releasing lever 23*a* so that the releasing lever 23*a* is rotated and the engaging of the engaging portion 235 and the notch 211 is released. Thereby, the falling preventive leg 23 can be drawn out frontward.

Here, in the structure of the present invention, a restriction mechanism is provided, that restricts, when at least one electronic equipment is drawn out frontward out of electronic equipment such as the printer 30, the scanner apparatus 40, and the control apparatus 50, so that at least any one of other electronic equipment can not be drawn out frontward. As an example of the structure realizing the restriction mechanism, a lock mechanism 70 for locking and fixing the falling preventive leg 23 and the rail portion 21*b* is provided.

In the present embodiment, the printer 30 and the control apparatus 50 are put on the mounting base 24 formed on the top face of the falling preventive leg 23. Further, the scanner apparatus 40 is disposed on the pedestal 20 so as to be drawable, separately from the printer 30 and the control apparatus 50. In addition, by drawing out the falling preventive leg 23 frontward, the printer 30 and the control apparatus 50 are drawn out frontward.

A releasing lever detection sensor 233 for detecting an operation of the releasing lever 23*a* is provided on the pedestal 20, which detects the operation when the releasing lever 23*a* is operated and the handle portion 234 is pulled upward. Then, in accordance with the detection result, the scanner apparatus 40 is locked so that the scanner apparatus 40 can not be drawn out. A specific example of the lock mechanism will be described below.

On the other hand, a scanner detection sensor is also provided in the side of the scanner apparatus 40 to detect the drawing-out operation thereof, and when the scanner detection sensor detects the drawing out operation of the scanner apparatus, the lock mechanism 70 shown in FIGS. 10A and 10B is operated to lock the falling preventive leg 23 on the rail portion 21*b*. Since the rail portion 21*b* is fixed in the side of the foundational base 22, the drawing-out of the falling preventive leg 23 is restricted.

In this way, when at least one electronic equipment is drawn out, the drawing-out of at least one of the other electronic equipment is restricted, and thereby it is possible to prevent the unbalanced load to the pedestal 20 and secure the stability of the pedestal 20.

Figure 11A:
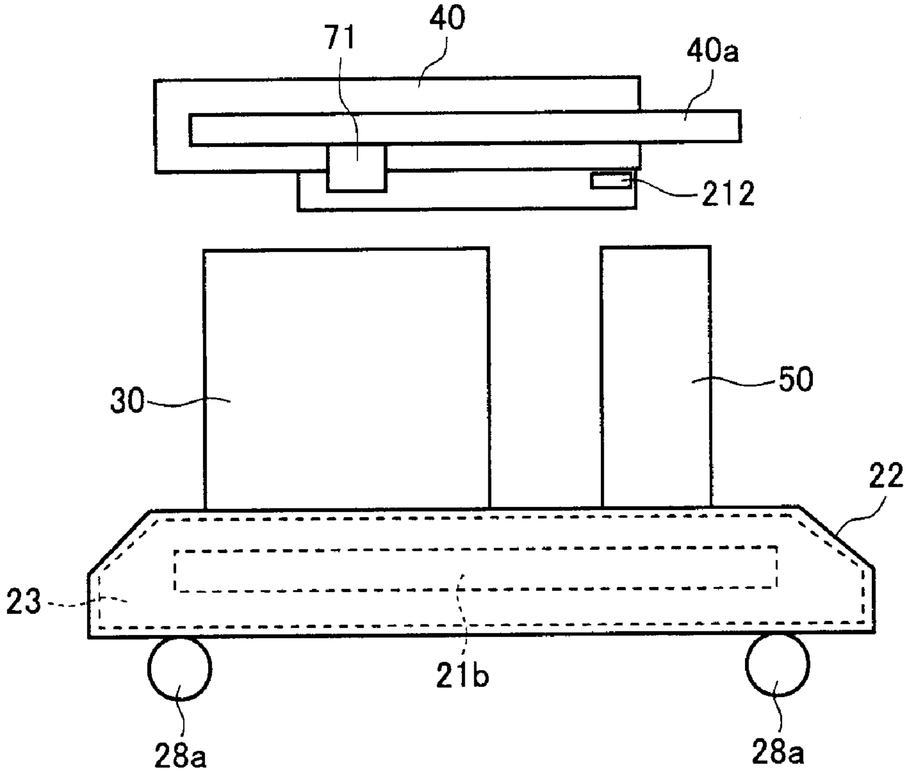
FIGS. 11A and 11B are diagrams illustrating the structure for locking a scanner apparatus.
Figure 11B:
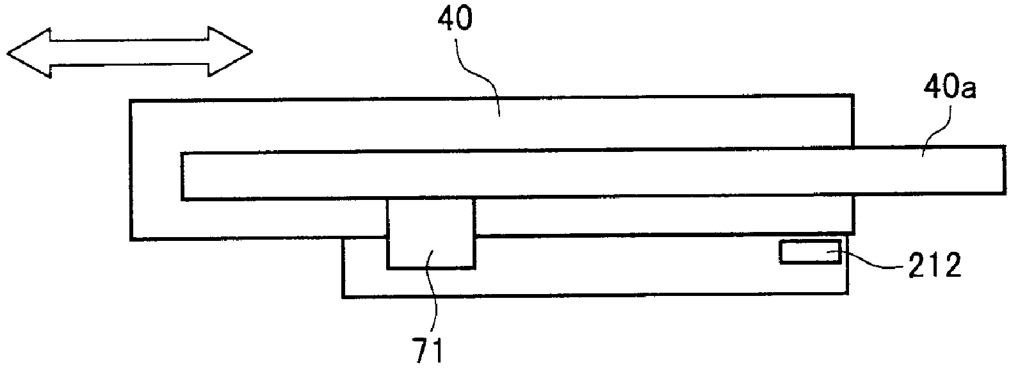

FIGS. 11A and 11B are diagrams illustrating the structure for locking the scanner apparatus, which shows a state where the scanner apparatus 40 is stored between the legs 21 of the pedestal 20. Here, FIG. 11A is a schematic view illustrating an arrangement example of a drawing-out operation detection sensor and the lock mechanism, and FIG. 11B is a view showing a main part of a mounting portion in the scanner apparatus of FIG. 11A.

The scanner apparatus 40 includes a rail portion 40*a* for engaging with the rail portion 21*a* provided on the leg of the pedestal so as to enable the slide movement.

Here, the leg 21 of the pedestal 20 is provided with a scanner detection sensor 212 for detecting a drawing-out operation of the scanner apparatus 40. The scanner detection sensor 212 may be provided in the side of the scanner apparatus 40 and configured so as to detect its own drawing-out operation.

Then, when the scanner detection sensor 212 detects that the scanner apparatus 40 has been drawn out frontward, the lock mechanism 70 of the falling preventive leg 23 shown in FIGS. 10A and 10B is operated to restrict the drawing-out of the falling preventive leg 23.

On the other hand, the leg 21 of the pedestal 20 is provided with a lock mechanism 71 for restricting the drawing-out of the scanner apparatus 40. When the releasing lever detection sensor 233 provided in the falling preventive leg 23 detects the drawing-out operation of the releasing lever 23*a*, in the scanner apparatus, the lock mechanism 71 is operated and the drawing-out of the scanner apparatus 40 to the front is restricted. Here, the lock mechanism 71 is fixed on the leg 21 to lock the rail portion 40*a* attached to the scanner apparatus 40, so that the drawing-out of the falling preventive leg 23 is restricted.

In addition, it may be configured such that the lock mechanism 71 is provided in the side of the scanner apparatus 40 so as to lock the rail portion 21*a* attached to the leg 21 of the pedestal 20.

Figure 12A:
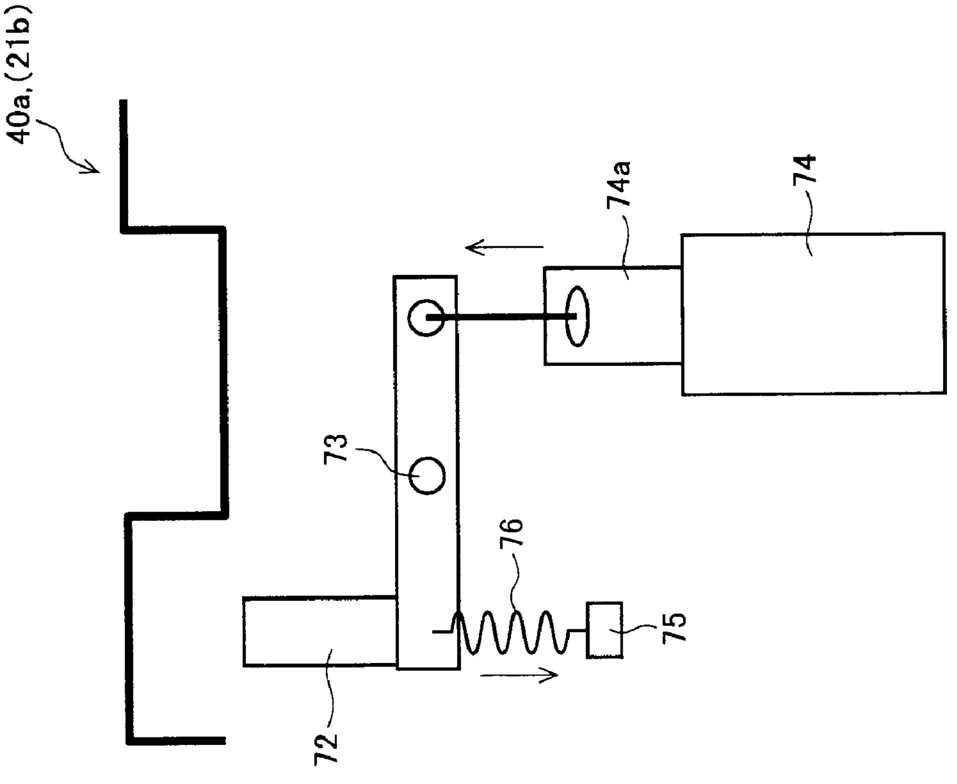
FIGS. 12A and 12B are schematic diagrams illustrating a structural example of a lock mechanism included in the pedestal.
Figure 12B:
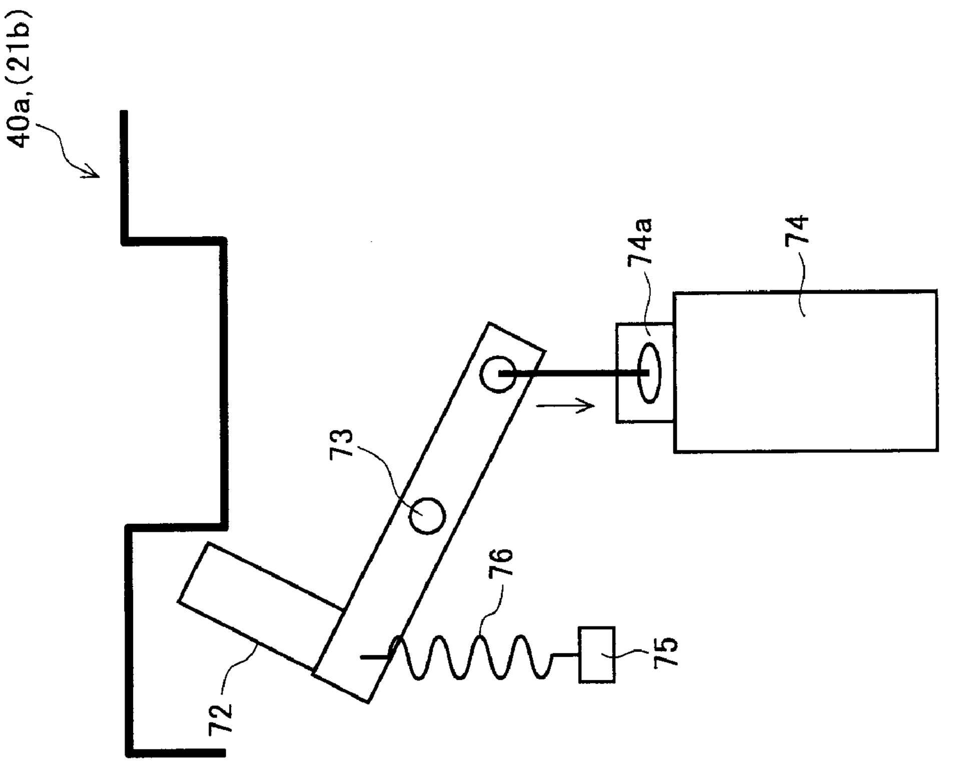

FIGS. 12A and 12B are schematic diagrams illustrating a structural example of the lock mechanism included in the pedestal, where FIG. 12A is a diagram showing a state where the drawing-out of an electronic equipment is not restricted when the lock mechanism is not operated, and FIG. 12B is a diagram showing a state where the drawing-out of an electronic equipment is restricted when the lock mechanism is operated. The lock mechanism shown in FIGS. 12A and 12B is applicable to both of the lock mechanism 70 provided on the falling preventive leg 23 and the lock mechanism 71 provided for locking the scanner apparatus 40.

The lock mechanism of the present embodiment has a lock lever 72 pivotably supported so as to be rotatable on the rotary shaft 73, a solenoid 74 for causing the lock lever 72 to rotate, and a spring member 76 for applying energization force to the lock lever 72.

A plunger 74*a* of the solenoid 74 is connected to one end of the lock lever 72 and the lock lever 72 is rotated depending on an operation of linear displacement thereof. Further, in the lock lever 72, the end in the opposite side of the other end where the solenoid 74 is connected is bent, and a tip part thereof is engaged with a notch provided on the rail portion 40*a* for slidingly moving the scanner apparatus 40 or the rail portion 21*b* for slidingly moving the falling preventive leg 23.

The spring member 76 for applying energization force to the direction where the engaging of the lock lever 72 is released is attached to a bent portion of the above lock lever 72. One end of the spring member 76 is attached in the vicinity of the bent portion of the lock lever 72 and the other end is attached to a fixing portion 75 of a wall part etc., of the pedestal 20.

With such a structure that the lock lever 72 can be rotated by electrically controlling the solenoid, and thereby the engaging/releasing of the lock lever 72 and the rail portion 40*a* or the rail portion 21*b* can be controlled. Accordingly, with the lock mechanism, the restriction of the drawing-out of the scanner apparatus 40 and the releasing thereof, and the restriction of the drawing-out of the falling preventive leg 23 (i.e., the printer 30 and the control apparatus 50) and the releasing thereof, can be controlled freely.

Figure 13A:
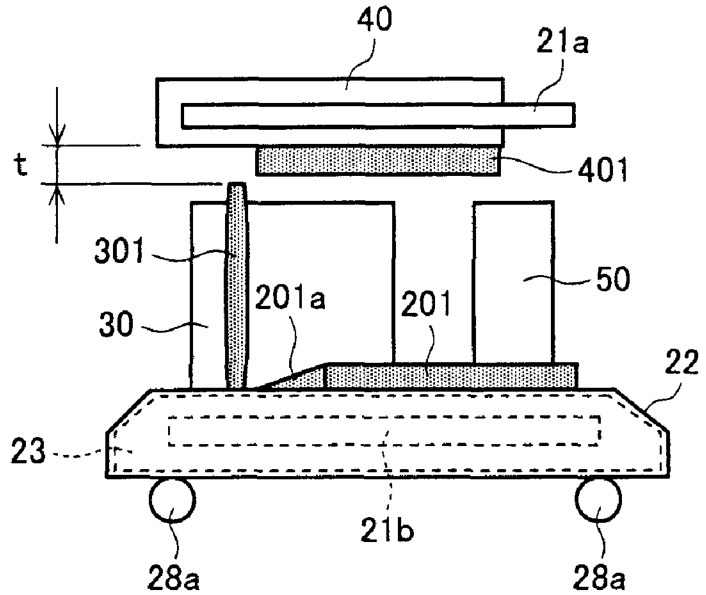
FIGS. 13A and 13B are schematic diagrams illustrating another structural example of a restriction mechanism for restricting the drawing out of electronic equipment.
Figure 13B:
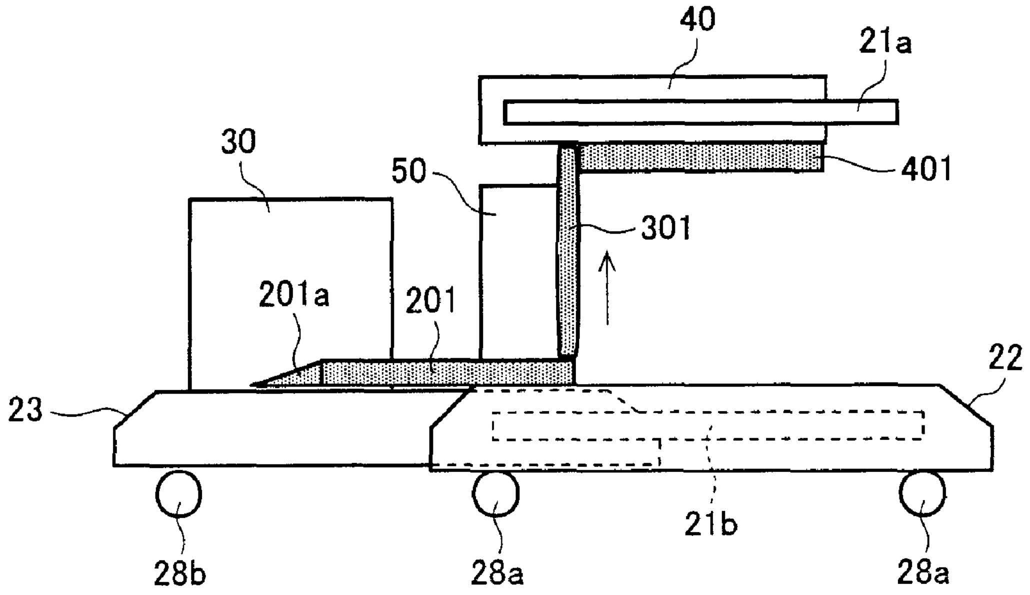

FIGS. 13A and 13B are schematic views illustrating another structural example of the restriction mechanism for restricting the drawing-out of electronic equipment, where FIG. 13A shows a state where the scanner apparatus 40, the printer 30, and the control apparatus 50 are stored in the pedestal 20, and FIG. 13B shows a state where the falling preventive leg 23 on which the printer 30 and the control apparatus 50 are put is drawn out.

In the present embodiment, a first stopper guide 301 is provided to be able to move in a vertical direction in the pedestal 20. Further, a second stopper guide 201 is provided in the falling preventive leg 23 so as to move in a body with the falling preventive leg 23. On the other hand, a stopper 401 is provided in the scanner apparatus 40 so as to move in a body with the scanner apparatus 40.

In the storage state shown in FIG. 13A, the first stopper guide 301 is positioned at the lower end within its movable range in the vertical direction. In addition, a front tip part 201*a* of the second stopper guide 201 provided in the falling preventive leg 23 is in contact with a rear face side of the lower end of the first stopper guide 301 or positioned in the vicinity thereof. The front tip part 201*a* is manufactured as a tapered shape with an acute tip.

In such a structure, when the falling preventive leg 23 is drawn out frontward, the front tip part 201*a* of the second stopper guide 201 integrally provided in the falling preventive leg 23 gets under the first stopper guide 301. At this time, since the front tip part 201*a* is manufactured as a tapered shape, the front tip part 201*a* advances frontward below the first stopper guide 301 while pushing the first stopper guide 301 upward.

This operation makes the first stopper guide 301 move upward so as to be in the state as shown in FIG. 13B. In the storage state shown in FIG. 13A, although there is a gap t between the upper end of the first stopper guide 301 and the bottom part of the scanner apparatus, there is almost no gap t in the state shown in FIG. 13B. Further, if there is the gap t, the stopper 401 can not pass therethrough. Thereby, when trying to draw out the scanner apparatus 40, the stopper 401 is in contact with the rear face side of the first stopper guide 301, thus making it impossible to further pull out the stopper 401 frontward. Accordingly, it is possible to restrict the drawing-out of the scanner apparatus 40 which is formed integrally with the stopper 401.

The structure as described above makes it possible to restrict, when the printer 30 and the control apparatus 50 of the electronic equipment including the printer 30, the scanner apparatus 40, and the control apparatus 50 are drawn out frontward, so that the other electronic equipment, namely, the scanner apparatus 40 can not be drawn out frontward.

Figure 14:
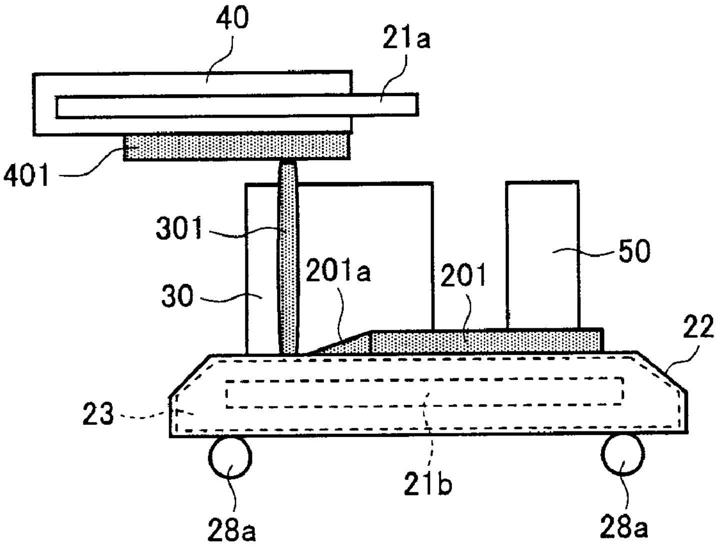
FIG. 14 is a diagram showing a state where the scanner apparatus is drawn out in the structure shown in FIGS. 13A and 13B.

FIG. 14 is a diagram showing a state where the scanner apparatus is drawn out in the structure shown in FIGS. 13A and 13B. In the storage state of electronic equipment shown in FIG. 13A, when the scanner apparatus 40 is firstly drawn out frontward, the stopper 401 which moves in a body with the scanner apparatus 40 passes through the gap t formed between the upper end of the first stopper guide 301 and the bottom of the scanner apparatus 40. Then, as shown in FIG. 14, at the position where the scanner apparatus 40 is drawn out frontward, the upper end of the first stopper guide 301 is in contact with the bottom face of the stopper 401, or is positioned in the vicinity of the bottom face, and therefore the upward displacement of the first stopper guide 301 is restricted.

In this state, the second stopper guide 201 can not pass below the first stopper guide 301 and the falling preventive leg 23 can not be drawn out frontward.

That is, with the above structure, it is possible to restrict, when the scanner apparatus 40 is drawn out frontward of the electronic equipment including the printer 30, the scanner apparatus 40, and the control apparatus 50, so that other equipment, namely, the printer 30 and the control apparatus 50 can not be drawn out frontward.

Figure 15:
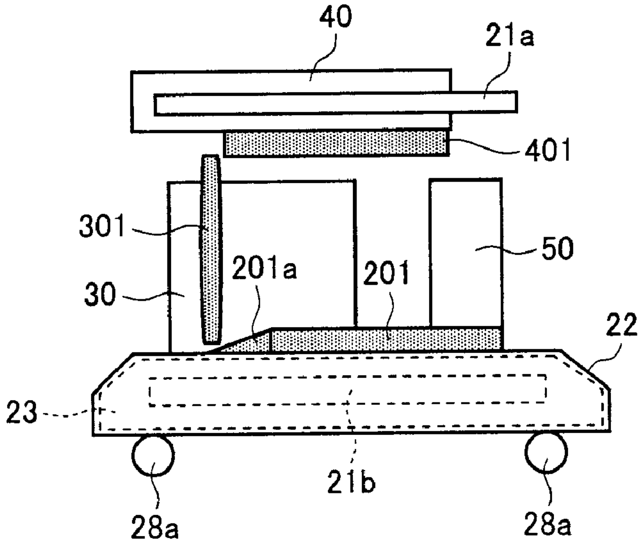
FIG. 15 is a diagram showing a state where both of the scanner apparatus and the falling preventive leg are intended to be drawn out in the structure shown in FIGS. 13A and 13B.

FIG. 15 is a diagram showing a state where both of the scanner apparatus and the falling preventive leg are being drawn out in the structure shown in FIGS. 13A and 13B.

In the storage state of the electronic equipment shown in FIG. 13A, when trying to draw out the falling preventive leg 23 on which the printer 30 and the control apparatus 50 are put, and the scanner apparatus 40 simultaneously, any of the electronic equipment can not be drawn out.

Here, depending on the drawing-out operation of the falling preventive leg 23, the second stopper guide 201 included in the falling preventive leg 23 acts on the first stopper guide 301 to push the first stopper guide 301 upward. In addition, at this time, the stopper 401 included in the scanner apparatus 40 acts on the first stopper guide 301 to pass through the upper side of the first stopper guide 301.

Further, since these are performed almost simultaneously, the first stopper guide 301 does not make any of the second stopper guide 201 and the stopper 401 pass and stops at the halfway position in a range of the vertical movement.

With such a structure, when trying to draw out the falling preventive leg 23 and the scanner apparatus 40 simultaneously, any of which can not be drawn out. That is, when an operation of drawing out all of the electronic equipment including the printer 30, the scanner apparatus 40, and the control apparatus 50 frontward simultaneously is performed, it is possible to restrict so that all of the electronic equipment can not be drawn out.

According to the present invention, following effect can be obtained.

According to the present invention, in a display system provided with a large-sized display apparatus and a pedestal supporting the display apparatus, it is possible to provide a display system in which a fall of the pedestal is prevented effectively and the space of the pedestal is used effectively.

In particular, in the present invention, when at least one electronic equipment is drawn out frontward, restriction is made so that at least one of other electronic equipment can not be drawn out frontward, and thereby it is possible to keep weight balance in the display system and prevent a fall.

Further, by providing a heavy electronic equipment in the lower part, the center of the gravity in the display system can be positioned downward and the weight balance in the display system is kept to prevent a fall.

Further, in the present invention, a falling preventive leg which is drawable is provided in a pedestal and a mounting base on which electronic equipment such as a printer can be placed is formed on the falling preventive leg, and thereby maintenance of the electronic equipment can be easily performed. In addition, at the time of drawing out the falling preventive leg, the electronic equipment moves to the draw-out direction, and therefore the weight of the electronic equipment is distributed to the draw-out direction and the weight of the whole of the system is equally distributed to center parts of a plurality of casters provided in the pedestal so as to improve the weight stability, thus it is possible to prevent a fall effectively.

Further, according to the present invention, the weight for the stability of the display system is provided by the electronic equipment such as a scanner and a printer, thus making it possible to reduce the waste weight and the vacant space in the pedestal (stand) can be used effectively.

The invention claimed is:

1. A display system having a display apparatus for displaying information and a pedestal for supporting the display apparatus from a lower side, in which a mounting base on which an electronic equipment is placed is provided in the pedestal and a plurality of electronic equipment are disposed below the display apparatus, wherein, when a face in which a display screen of the display apparatus is visible is defined as a front face of the display apparatus, and a near side toward the face in which the display screen is visible is defined as a front side of the display system, the plurality of electronic equipment are disposed so as to be drawable frontward from the front face of the display apparatus, and a restriction mechanism is provided for restricting, when at least one electronic equipment is drawn out frontward, so that at least one of the other electronic equipment can not be drawn out frontward, wherein the pedestal has a falling preventive leg for preventing a fall of the display system and a foundational base for supporting the mounting base, the mounting base being on the falling preventive leg, wherein the falling preventive leg is slidable relative to the foundational base.

2. The display system as defined in claim 1, wherein among the plurality of electronic equipment, an electronic equipment which is heavier than other electronic equipment is disposed downward from the other electronic equipment.

3. The display system as defined in claim 1, wherein the electronic equipment includes an image reading apparatus for reading an image from an original to generate image data, an image forming apparatus for forming the image on a recording medium in accordance with the image data, and a control apparatus for controlling a display screen of the display apparatus.

4. The display system as defined in claim 3, wherein the image reading apparatus and the image forming apparatus are respectively and individually disposed so as to be slidingly movable, and are drawable frontward from a stored position in the pedestal respectively and individually.

5. The display system as defined in claim 3, wherein the image forming apparatus and the controlling apparatus are disposed so as to be able to slide in a body, and are drawable frontward in a body from the stored position in the pedestal.

6. The display system as defined in claim 1, wherein the mounting base is drawable by sliding frontward from the position where the falling preventive leg is stored in the foundational base, and wherein the falling preventive leg is positioned at the same position as, or at the position backward from, the front face of the display apparatus with respect to a back and forth direction of the display system when the falling preventive leg is stored in the foundational base, and protrudes frontward from the front face of the display apparatus when the falling preventive leg is drawn out forward.

7. The display system as defined in claim 6, wherein a fixing mechanism for fixing the foundational base and the falling preventive leg, in a state where the falling preventive leg is stored in the foundational base, or is drawn out by sliding frontward.

* * * * *